3 Sheets—Sheet 1.

G. SCHLEICHER.
Circular Sawing-Machine.

No. 202,668. Patented April 23, 1878.

Witnesses.
Geo. P. Byrne
Alfred Shedlock

Inventor.
Gustave Schleicher,
per E. H. Johnson,
Atty.

N. PETERS, PHOTO-LITHOGRAPHER, WASHINGTON, D C.

3 Sheets—Sheet 2.

G. SCHLEICHER.
Circular Sawing-Machine.

No. 202,668. Patented April 23, 1878.

Witnesses
Geo. P. Byrne
Alfred Shedlock

Inventor
Gustave Schleicher
per E. H. Johnson
atty.

N. PETERS, PHOTO-LITHOGRAPHER, WASHINGTON, D.C.

3 Sheets—Sheet 3.
G. SCHLEICHER.
Circular Sawing-Machine.
No. 202,668. Patented April 23, 1878.
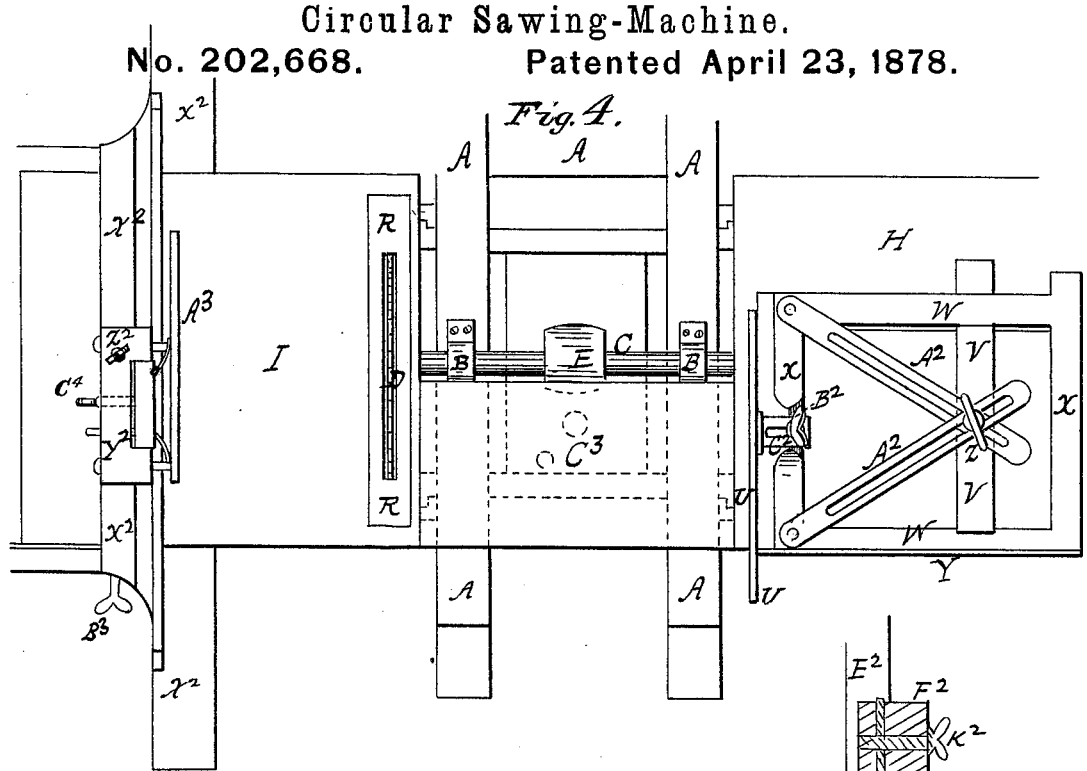
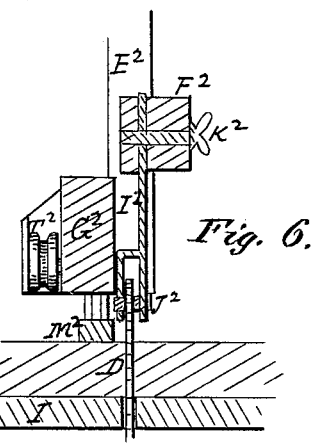
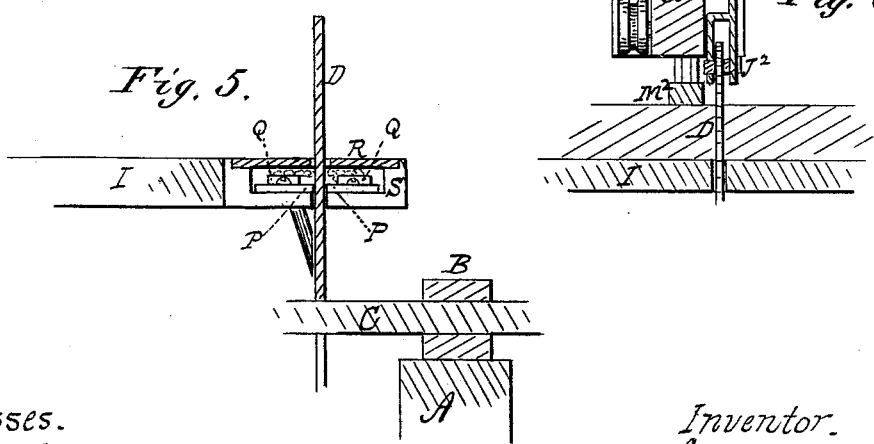
Witnesses.
Geo. T. Byrne
Alfred Shedlock
Inventor.
Gustav Schleicher.
per E. N. Johnson.
Atty.

UNITED STATES PATENT OFFICE.

GUSTAV SCHLEICHER, OF MOUNT VERNON, NEW YORK.

IMPROVEMENT IN CIRCULAR SAWING MACHINES.

Specification forming part of Letters Patent No. 202,668, dated April 23, 1878; application filed February 27, 1878.

*To all whom it may concern:*

Be it known that I, GUSTAV SCHLEICHER, of Mount Vernon, in the county of Westchester and State of New York, have invented certain Improvements in Circular or Bench Saw Machines, of which the following is a specification:

My invention relates to circular or bench saw machines; and consists in a novel construction, combination, and arrangement of parts; and has for its objects to render the feeding of such machines automatic, and to improve their operation and facilitate their manipulation, as will be fully hereinafter set forth.

Figure 1:
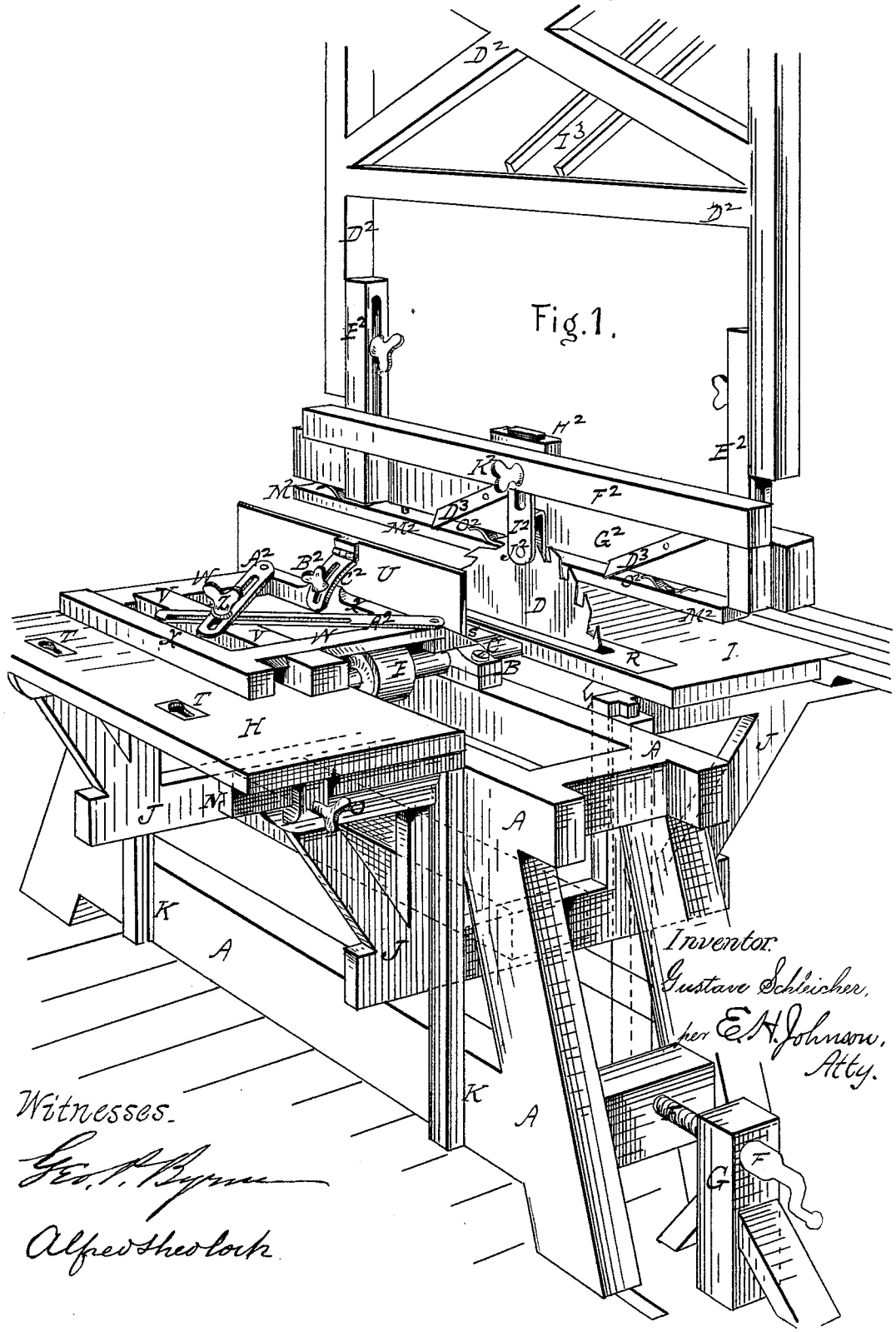
Figure 2:
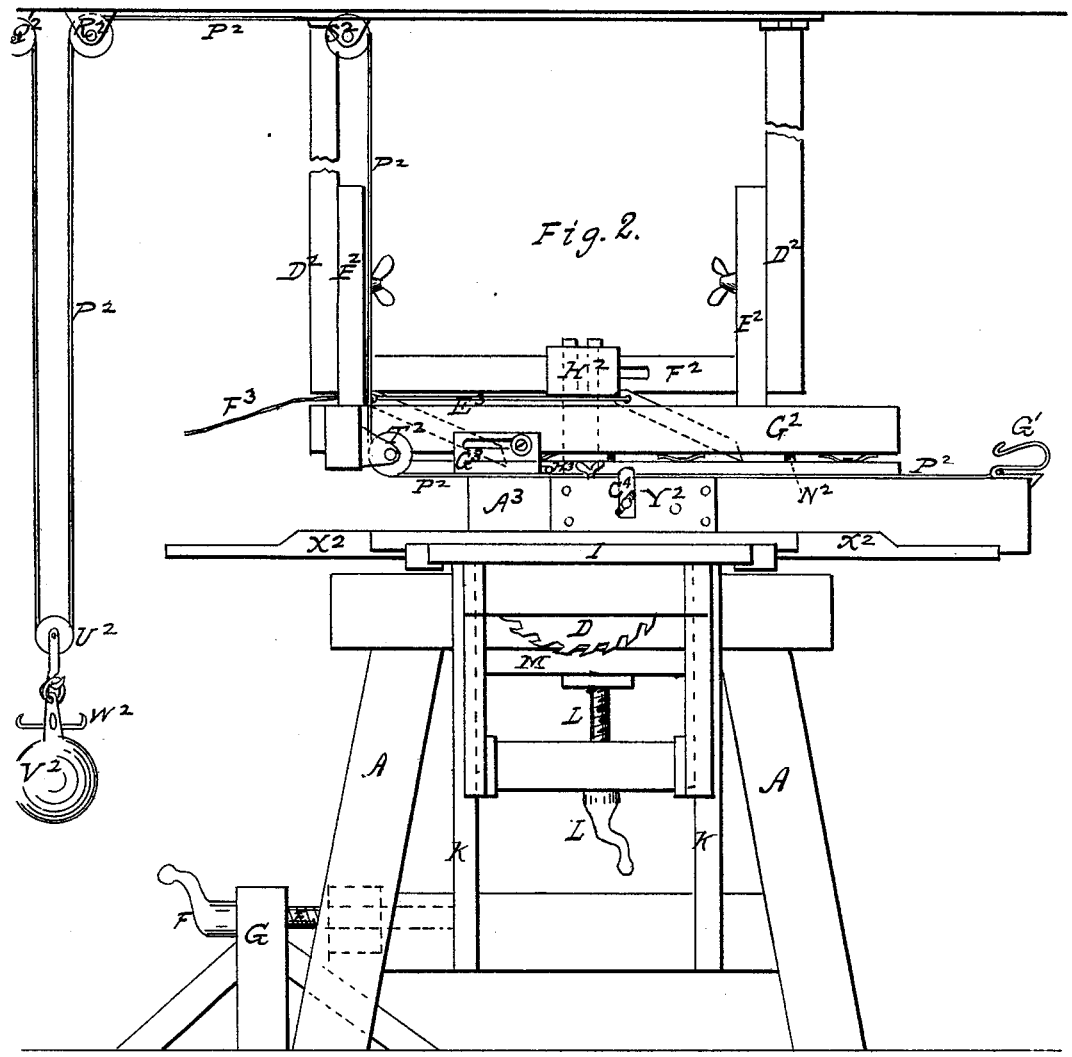
Figure 3:
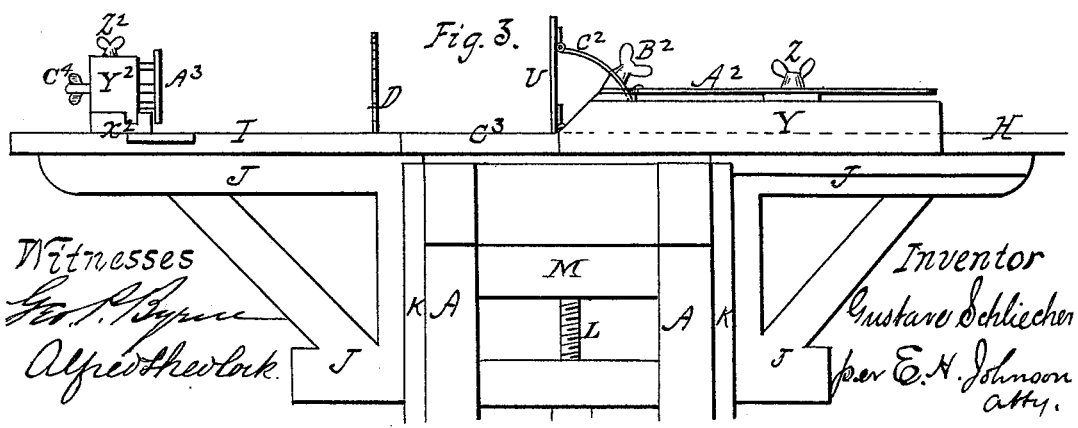

In the accompanying drawings, Figure 1 is a perspective view of a machine embodying my improvements; Fig. 2, a side elevation; Fig. 3, an end elevation of the upper portion of the machine; Fig. 4, a plan or top view; and the remaining figures parts in detail.

A represents the main supporting-frame of the machine, having suitable bearings B for the saw-spindle C, on which are the saw D and pulley E. The frame A is capable of a limited longitudinal motion along the flooring, being guided by tenons on its legs entering mortises in the floor, and it has motion imparted to it by the screw F, swiveled to post G. This movement is imparted to the frame for the purpose of tightening the driving-belt when necessary.

The tables of the machine, H I, are carried on frames J J, sliding vertically in grooved guide-strips K on the sides of the frame A, and are adjusted vertically by means of the screw L, swiveled to cross-bar M of frame A.

The table H is capable of being slid horizontally on its frame J, it being guided in such movement by the grooved guides N, and secured in position by the set-screw O, as shown.

The table I is provided with a slot, through which the saw works, and around this slot the table is cut down below its surface, for containing the guide-pieces P for holding the saw true, and also the cups Q for containing oiled waste or other fibrous material, for the purpose of supplying oil to the surface of the saw. This recessed portion of the table is covered by the slotted plate R, the upper surface of which is just flush with that of the table.

The portion of the table I immediately over the saw-spindle is cut away, as shown at S, Figs. 1 and 5, so as to permit the table to be lowered to its fullest extent, whereby the saw may be used "full."

The table H is provided with eyes T for securing to it the adjustable gage U, the bar V having buttons for entering the eyes T. The gage U slides to and from the saw, being guided by the strips W of the frame W X, which slide in dovetailed grooves in the bar V, and it is kept true in its motion by the strip Y, which runs against the side of the table.

The gage is secured in any position by the thumb-screw Z passing through the slotted arms $A^2$, attached to the frame W X, as shown in Figs. 1 and 4.

The gage-plate U itself is hinged to the frame W X, so as to be inclined at any angle to the table, for the purpose of sawing bevel or miter.

For cutting a bevel which is not a miter, the thumb-screw $B^2$ is loosened and the gage adjusted to the desired angle, and then secured by turning upon the screw $B^2$, which passes through the slotted curved arm $C^2$, hinged to the back of the gage, whereby this arm is clamped to the frame. For the purpose of cutting miter, it is only necessary to take out the screw $B^2$ and turn the gage back till it rests on the frame. It will then be in proper position to cut miter, the bar of the frame to which it is hinged being beveled to an angle of forty-five degrees, as shown at Fig. 3.

The guide just described is intended to be used principally when the machine is employed for ripping or slitting up stuff. When it is to be employed for crosscutting, the gage may be taken off and the opening between the two tables closed by inserting the pieces $C^3$, thus making a full table for the support of the stuff.

It will be noticed that there are two pairs of eyes in the table H, and that the gage may be secured in either, rendering it capable of a wide range of movement.

I will now proceed to describe that part of my invention relating to the automatic feeding of the machine.

From the ceiling of the room, immediately over the machine, is hung by hinges a frame, $D^2$, and to the lower extremities of this frame are secured, by the slotted bars $E^2$, the bars $F^2$ $G^2$. To the middle of the bar $F^2$ is attached a block, $H^2$, through which passes the slotted upper extremity of a fork, $I^2$, which straddles the saw D. Through each prong or limb of this fork passes a screw or pin, $J^2$, the inner extremities of which act to hold the saw true. This fork is adjustable vertically in its block $H^2$, and the block is adjustable along the bar $F^2$, so that the position of the fork may be accurately fixed, it being held in such position by the thumb-screws $K^2$.

The bar $G^2$ is provided on its bottom with a pressure bar or strip, $M^2$, which is connected to it by the pins $N^2$. $O^2$ are springs acting between bars $G^2$ and $M^2$. $P^2$ is a cord attached to the ceiling by a winding or stationary pin, and passing over the pulleys $Q^2$ $R^2$ $S^2$ on the ceiling and down to and around the pulley $T^2$ on the bar $G^2$. At its free end it has attached a hook, $G^1$, shaped as shown in the drawings, and in its fall between the pulleys $Q^2$ $R^2$ it carries the running pulley $U^2$, having attached thereto a weight, $V^2$. This weight is provided with hooks $W^2$, to which additional weights may be attached when necessary.

On the table I slides the bar $X^2$, carrying the block $Y^2$, which is capable of moving along the bar, and is clamped thereto by the screw $Z^2$. This block is provided with a spring pressure-plate, $A^3$. The bar $X^2$ is secured in position to the table by the thumb-screw $B^3$, and the pressure of the plate $A^3$ may be adjusted by the screw $C^4$.

To the inside of the bar $G^2$—that is, the side next the saw—are pivoted the two dogs or sharp-pointed blades $D^3$, their upper extremities being connected by a rod or wire, $E^3$. A string, $F^3$, is attached to them, by which they may be operated. To the other (the outer) side of the bar $G^2$ is attached the slotted block $G^3$, from which projects the pin $H^3$, which may be turned into either a horizontal or vertical position.

The frame $D^2$, being hinged, may (with the mechanism which it supports and carries) be thrown up out of the way, being drawn up by a cord, as usual in such instances, or otherwise move up, and held by the bars $I^3$.

The operation of the feed will be readily understood from the foregoing description. Suffice it to say that, the parts having been properly adjusted and the gage U set as desired, the stuff is placed under the bar $G^2$, so that its pressure-strip $M^2$ shall bear upon it with proper degree of pressure, and the pressure block or plate $A^3$ brought up against the side of the stuff, so as to hold it snugly in proper position. These preliminaries having been effected, the hook $G^1$, at the extremity of the weighted cord, is hooked over the end of the stuff. A forward motion of the wood will, however, be prevented by the dogs $D^3$ embedding themselves in it. All being in readiness, the string $F^3$ is pulled, releasing the dogs, and the weight then commences to feed the stuff to the saw. The feed may be arrested at any moment by throwing the dogs down, so that they shall catch into the wood.

In cutting a thin board, the pin $H^3$ is turned in a vertical position downward, to guide the stuff and hold it up as it passes along.

I employ in my machine a saw the teeth of which are shaped and filed up in a novel manner, as shown. The inner edge of the tooth $a$ $b$ is straight, and is a part of the side of a regular pentagon inscribed in the circle of the saw. For crosscutting I combine with such a tooth scoring-teeth $c$ $c$.

I am aware that vertically-adjustable tables have been used in circular-saw or bench-saw machines, and that logs have been fed in sawmills by cords and endless chains, and I disclaim such.

I claim—

1. In a bench or circular saw machine, the combination, with the yielding pressure-bar, gage, and yielding adjustable pressure-block, of a cord for feeding the stuff to the saw, operated by a falling weight, constructed and operating substantially in the manner described and specified.

2. In a bench or circular saw machine, the combination of the hinged frame $D^2$, provided with vertically-adjustable pressure-bar $G^2$ $M^2$ and horizontally-adjustable spring pressure-block $Y^2$ $A^3$, with the weighted feed-cord $P^2$, provided with hook $G^1$, constructed and operating substantially in the manner described and specified.

3. In a bench or circular saw machine, the combination, with a weighted-cord feeding device, of the dogs $D^3$, for preventing or arresting the feeding of the stuff, constructed and operating substantially in the manner described and specified.

4. The combination, with table H, of the gage-plate U, frame W X, bar V, slotted arms $A^2$, set-screw Z, and guide-strip Y, constructed and operating substantially in the manner described and specified.

5. The combination, with the spring-pressure adjustable block $Y^2$ $A^3$, adjustable gage U, and adjustable pressure-bar $G^2$ $M^2$, constructed and operating substantially in the manner described and specified.

GUSTAV SCHLEICHER.

Witnesses:
E. H. JOHNSON,
CHAS. GILMORE.